June 30, 1931.  A. WELIKES  1,812,817
SHOCK ABSORBER
Filed May 31, 1930   3 Sheets-Sheet 1
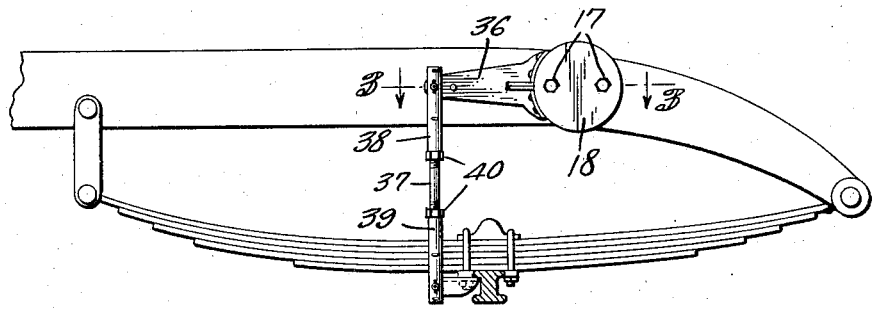
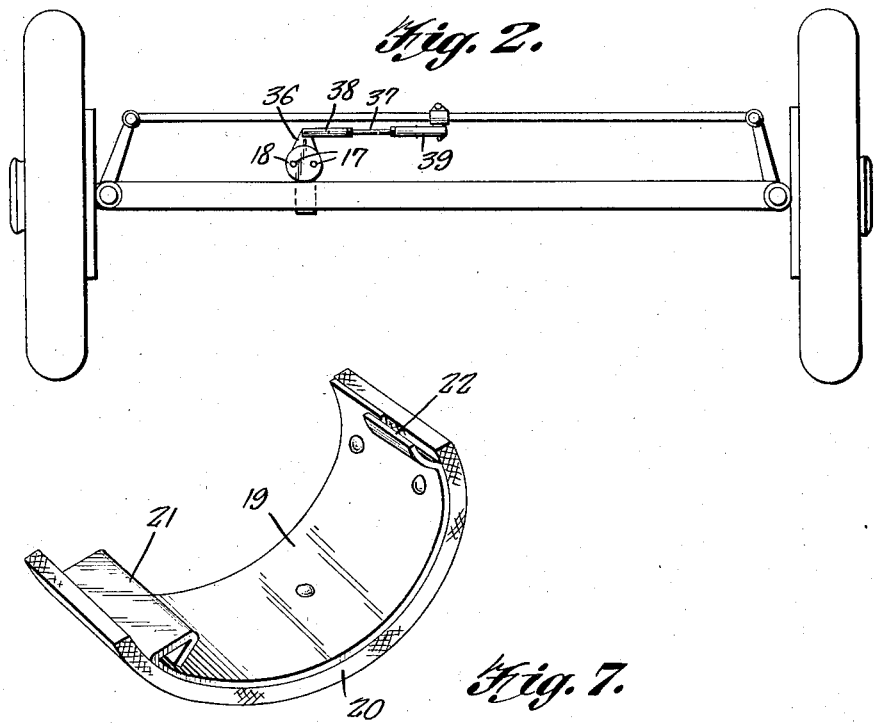
Anthony Welikes, INVENTOR
BY Victor J. Evans
ATTORNEY June 30, 1931.  A. WELIKES  1,812,817
SHOCK ABSORBER
Filed May 31, 1930     3 Sheets-Sheet 2
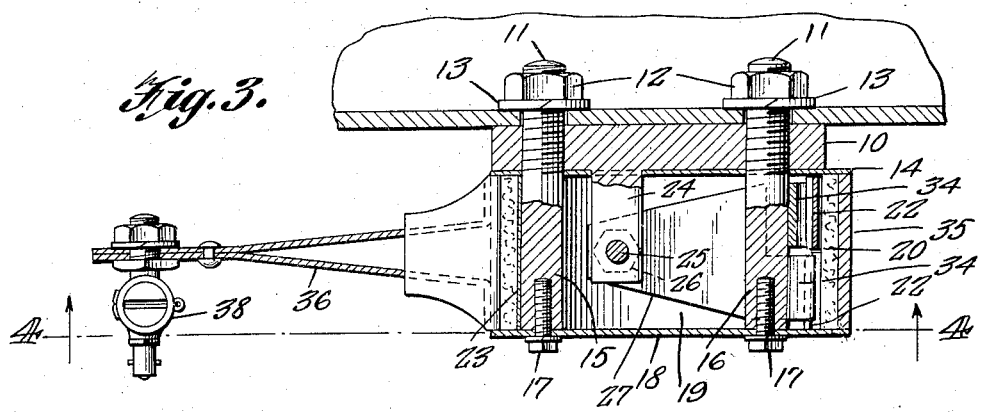
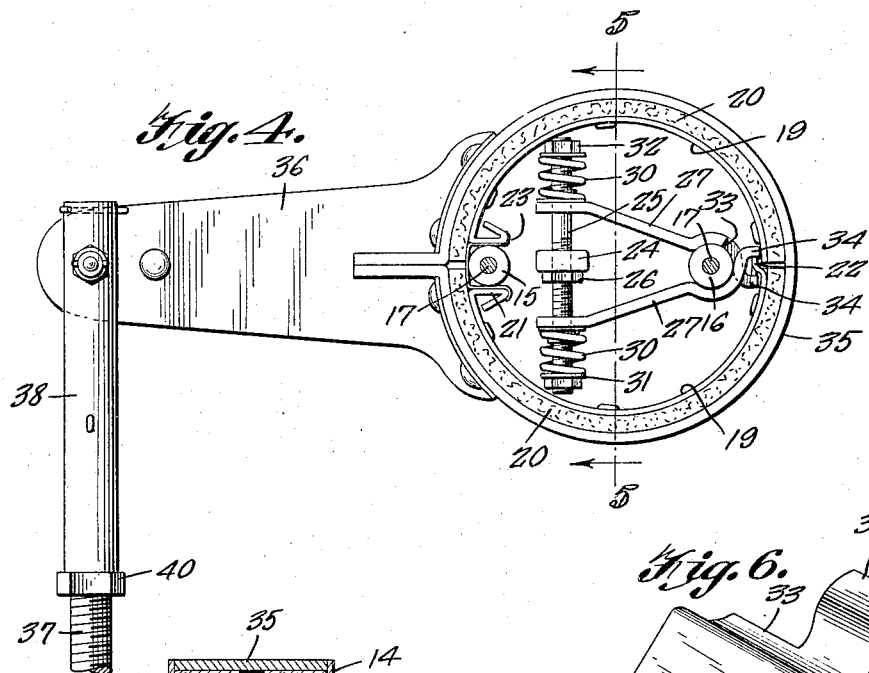
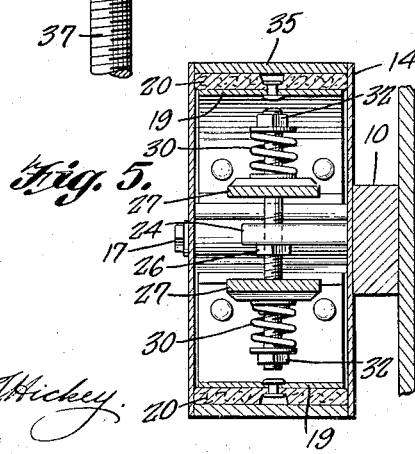
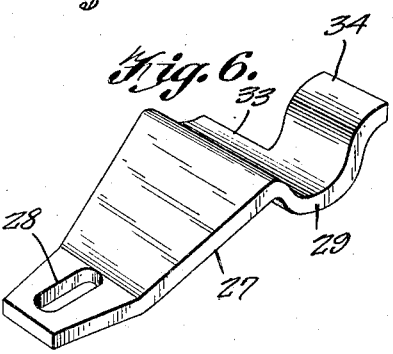
Anthony Welikes,
INVENTOR
BY Victor J. Evans
ATTORNEY
WITNESS: P. J. Hickey June 30, 1931.    A. WELIKES    1,812,817
SHOCK ABSORBER
Filed May 31, 1930    3 Sheets-Sheet 3
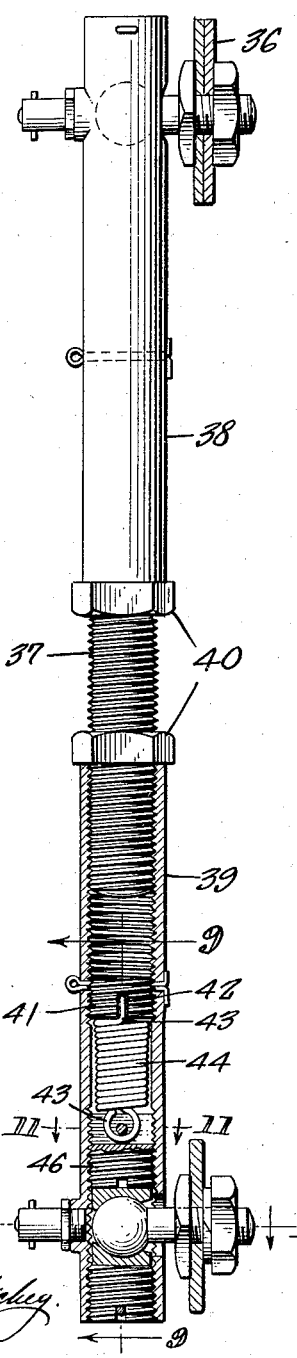
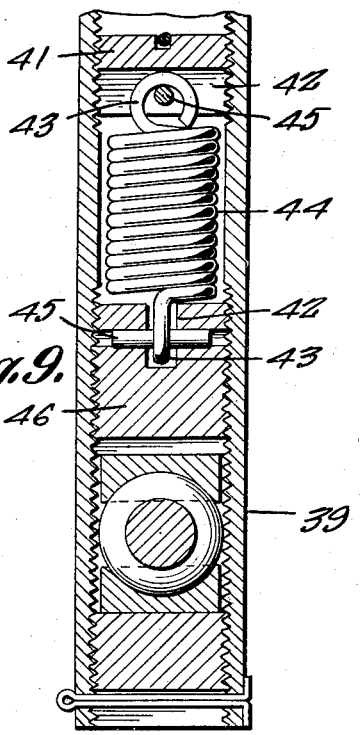
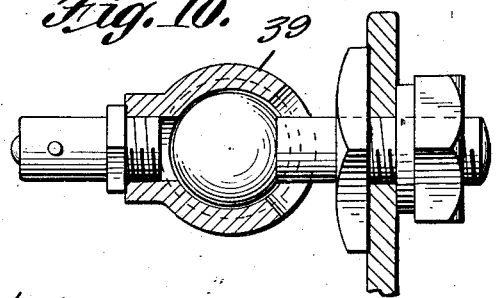
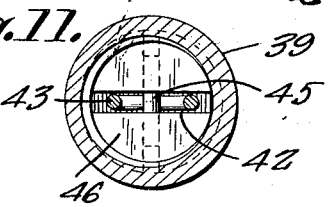
Anthony Welikes, INVENTOR
BY Victor J. Evans
ATTORNEY Patented June 30, 1931

1,812,817

UNITED STATES PATENT OFFICE

ANTHONY WELIKES, OF ROCHESTER, NEW YORK

SHOCK ABSORBER

Application filed May 31, 1930. Serial No. 458,404.

This invention relates to certain new and useful improvements in shock absorbers for vehicles and the like having for its principal object means for restricting undue motion in both directions.

One of the principal objects of the invention consists of yieldable adjusting means for the absorber for frictionally checking such movement.

Another object of the invention contemplates the provision and arrangement of connecting means for the absorber to the spring or steering mechanism of the vehicle.

More specifically stated the connecting means is provided with automatic self-adjusting wear take-up means whereby looseness will not occur at the several points of assemblage.

With the above and other objects in view, the invention further consists of the following novel features and details of construction, to be hereinafter more fully described, illustrated in the accompanying drawings and pointed out in the appended claim.

In the drawings:

Figure 1 is a side elevation of the present invention as applied upon a motor vehicle chassis and spring and serving the purpose of a shock absorber.

Figure 2 is a top plan view of the invention shown applied upon a motor vehicle as a wheel shimmy eliminator.

Figure 3 is a longitudinal sectional view taken on line 3—3 of Figure 1.

Figure 4 is a sectional view taken on line 4—4 of Figure 3.

Figure 5 is a sectional view taken on line 5—5 of Figure 4.

Figure 6 is a perspective view of an adjusting element for the snubber shoes.

Figure 7 is a perspective view of one of the shoes.

Figure 8 is an enlarged elevation of a connecting element partly in section.

Figure 9 is an enlarged sectional view taken on line 9—9 of Figure 8.

Figures 10 and 11 are horizontal sectional views taken on lines 10—10 and 11—11 respectively through Figure 8 of the drawings.

Referring to the drawings in detail wherein like characters of reference denote corresponding parts, the reference character 10 indicates generally an attaching plate having bolt members 13 passed through suitable openings in a vehicle chassis shown in Figures 3 and 5 to accommodate nuts and lock washers 12 and 13 upon the opposite side of the chassis and within the channel thereof. A disk member 14, carried upon the plate 10, has supporting members 15 and 16 outwardly projecting therefrom and provided with socket openings within the outermost ends thereof to accommodate the shanks of cap screws 17 for the securing of a cover plate 18 thereagainst. Brake shoes or brake band sections for the shock absorbers comprise brake band sections 19 having suitable linings 20 riveted or otherwise secured to the outer surfaces thereof. Inasmuch as the brake bands are arranged in pairs, it is to be noted that each of the bands will be of semicircular shape forming parallel shoulder portions 21 and fins 22 respectively at the extremities thereof.

A retaining clip 23 is provided for the combined purpose of separating the shoulder portions 21 and as a wear plate for the supporting member 15 in the manner suggested in Figure 4 of the drawings. A stationary ear 24, arranged upon the outer surface of the disk 14, has threadedly mounted for adjustable engagement therewith a shaft 25 carrying a jam or lock nut 26. Pressure and frictional engagement of the linings 20 for the brake band sections 19 is regulated through arm members 27 slotted, as at 28, to accommodate the projecting ends of the adjusting shaft 25 and curved, as at 29, for engagement with the supporting member 16 in the manner shown. Compression springs 30 encircling those portions of the shaft 25 beyond the slotted ends of the arm members 27 are sprung at their ends against the aforementioned extremities of the arm members 27 and against bearing washers 31 adjustably positioned through the employment of nuts 32. The arm members 27 are provided with registering interfitting cut-out portions 33 to permit the inverse arrangement of same in the manner suggested in Figure 4 of the drawings and to facilitate engaging of the ears 34 upon the remaining extremities thereof with the adjacent ends of the fins 22. A drum 35, encircling the registering band linings 20 and frictionally engaged therewith, is provided with a crank arm 36.

From the foregoing description and accompanying drawings, it is understood that the brake band sections or brake shoes will exercise constant tension against the inner surface of the drum 35 whereby rotary shifting motion of the drum in either direction will be frictionally restricted. The nuts 32 provide the means for equalizing the tension and frictional engagement of the linings against the drum.

As generally known in shock absorbers of the two-way type, the medium of connection between the shock absorber and the affected part of the vehicle is through a form of shaft having adjustable end sections. It is also my purpose to employ a connecting means of this character, the shaft of which being identified by the reference numeral 37 and exteriorly threaded throughout the length thereof carries sleeve sections 38 and 39 respectively lockingly maintained in adjusted position through the employment of jam nuts 40. Knuckle joints of conventional form are employed within the outermost ends of the sleeve sections 38 and 39 and are adjusted for looseness and wear in the ordinary manner with the addition of an automatic wear take-up mechanism about to be described. The latter mentioned construction primarily resides in the provision and arrangement of an auxiliary plug member 41 threadedly mounted for longitudinal adjustment within the bores of the sleeves and slotted, as at 42, to accommodate an attaching eye 43 in the adjacent end of a retractile spring 44. Cross pins 45 passed through the eyes 43 of the springs 44 and secured terminally thereof within the opposed walls forming the slots 42 provide for unity of movement. A connection of like character is established between the remaining ends of the springs and the adjacent portions of the innermost plugs 46. The knuckle joints are initially assembled and the auxiliary plugs 41 are then turned down sufficiently to exercise rotary unravelling tension upon the springs 44 whereby looseness caused by wear between any of the several parts of the knuckle joints will be automatically taken up through the unravelling of the springs.

It is believed by the installation of shock absorbers of this character that ultimate riding ease will be derived and the maintenance cost will be nearly negligible in that no fluids will require changing and replacement, no adjustments will be necessary at the knuckle joints and in fact the only thing required in the proper maintenance of the shock absorber will be in the equalizing of the frictional tension of the linings 20 against the adjacent inner surface of the drum.

From the illustrative suggestion in Figure 2 of the drawings, it is noted that one of these absorbers may be employed to effect upon the axle of a motor vehicle for connection with the tie rod whereby wheel shimmy and road shock will be absorbed and none of such movement will be ultimately transmitted to the steering wheel.

The invention is susceptible of various changes in its form, proportions and minor details of construction and the right is herein reserved to make such changes as properly fall within the scope of the appended claim.

Having described the invention, what is claimed is:

A shock absorber comprising a stationary disk having spaced diametrically opposed supporting members extended from one side thereof, a cover plate carried upon the other ends of the supporting members in confronting relation to the disk, a drum interposed for oscillatory movement between the disk and cover plate and about the supporting member, a shaft located within the enclosure defined between the several parts at right angles to the supporting members, brake shoes having the band sections therefor provided with portions upon the ends thereof positioned upon opposite sides of one of the supporting members to prevent synchronous rocking motion of the bands with the drum, fins carried upon the opposite ends of the band sections and arranged in staggered relation, arm members adjustably mounted upon the shaft and curved at spaced points for rocking motion against opposite sides of the remaining supporting member, and ears formed upon the ends of the arm members adjacent the curved portions and disposed in intersecting relation for engagement with said fins.

In testimony whereof I affix my signature.

ANTHONY WELIKES.